United States Patent
Moriya et al.

(10) Patent No.: US 10,336,899 B2
(45) Date of Patent: Jul. 2, 2019

(54) POLYBUTYLENE TEREPHTHALATE RESIN COMPOSITION

(71) Applicant: WinTech Polymer Ltd., Tokyo (JP)

(72) Inventors: Shotaro Moriya, Fuji (JP); Kouichi Sakata, Fuji (JP)

(73) Assignee: WinTech Polymer Ltd., Tokyo (JP)

(*) Notice: Subject to any disclaimer, the term of this patent is extended or adjusted under 35 U.S.C. 154(b) by 0 days.

(21) Appl. No.: 15/743,715

(22) PCT Filed: Jul. 5, 2016

(86) PCT No.: PCT/JP2016/069836
§ 371 (c)(1),
(2) Date: Jan. 11, 2018

(87) PCT Pub. No.: WO2017/010337
PCT Pub. Date: Jan. 19, 2017

(65) Prior Publication Data
US 2018/0201778 A1  Jul. 19, 2018

(30) Foreign Application Priority Data
Jul. 16, 2015  (JP) ................. 2015-142207

(51) Int. Cl.
*C08L 67/02* (2006.01)
*C08K 7/14* (2006.01)
*C08L 23/08* (2006.01)
*C08L 63/00* (2006.01)
*C08J 3/20* (2006.01)

(52) U.S. Cl.
CPC .............. *C08L 67/02* (2013.01); *C08J 3/203* (2013.01); *C08K 7/14* (2013.01); *C08L 23/08* (2013.01); *C08L 63/00* (2013.01); *C08J 2367/02* (2013.01); *C08J 2433/08* (2013.01); *C08J 2463/00* (2013.01); *C08L 2203/20* (2013.01); *C08L 2205/03* (2013.01)

(58) Field of Classification Search
None
See application file for complete search history.

(56) References Cited

U.S. PATENT DOCUMENTS

| 6,582,824 B1* | 6/2003 | Weigl ............... B60R 13/04 |
| | | 428/413 |
| 2017/0029615 A1* | 2/2017 | He ..................... C08L 67/00 |

FOREIGN PATENT DOCUMENTS

| CN | 102634176 A | 8/2012 | |
| JP | 2001-40190 A | 2/2001 | |
| JP | 2007-234260 A | 9/2007 | |
| JP | 2009-173860 A | 8/2009 | |
| JP | 2010-280793 A | 12/2010 | |
| JP | 2011-231191 A | 11/2011 | |
| WO | 2007/007663 A1 | 1/2007 | |
| WO | 2011-148796 A | 12/2011 | |
| WO | WO 2015/200272 A2 * | 12/2015 | ............. C08L 67/02 |

OTHER PUBLICATIONS

Machine translation of CN 101218305 A, equivalent of WO 2007/007663 A1 (no date).*
International Search Report dated Sep. 27, 2016, issued in counterpart application No. PCT/JP2016/069836. (2 pages).
Decision to Grant a Patent dated Feb. 21, 2017, Issued in counterpart Japanese Patent Application No. 2016-567961, w/English translation (6 pages).
Office Action dated Dec. 17, 2018, issued in counterpart CN application No. 201680041586.3, with partial English translation. (5 pages).

* cited by examiner

*Primary Examiner* — Michael J Feely
(74) *Attorney, Agent, or Firm* — Westerman, Hattori, Daniels & Adrian, LLP

(57) ABSTRACT

A polybutylene terephthalate resin composition containing a polybutylene terephthalate resin, 10 to 20% by mass of glass fiber relative to a total mass of the composition, an ethylene/ethyl acrylate copolymer, and an epoxy compound having an epoxy equivalent weight of 600 to 1,500 g/equivalent, and having a comparative tracking index (CTI) of 600 V or higher, measured in accordance with the third edition of IEC 60112.

7 Claims, No Drawings

POLYBUTYLENE TEREPHTHALATE RESIN COMPOSITION

TECHNICAL FIELD

Embodiments of the present invention relate to a resin composition containing a polybutylene terephthalate resin.

BACKGROUND ART

Polybutylene terephthalate resins (hereafter also referred to as "PBT resins") have a high heat distortion temperature and exhibit excellent electrical properties, mechanical properties, weather resistance and chemical resistance and the like, and are consequently widely used as engineering plastics in a variety of applications, including electrical and electronic components, and vehicle components and the like.

Components such as relays, switches and connectors that are used in the vicinity of power sources of electrical and electronic components require tracking resistance in order to ensure adequate safety from the possibility of ignition associated with electrical loading. For this reason, improvements have also been made to PBT resin compositions to improve their tracking resistance.

PRIOR ART DOCUMENTS

Patent Documents

Patent Document 1: JP 2011-231191 A
Patent Document 2: JP 2010-280793 A
Patent Document 3: WO 2011/148796

DISCLOSURE OF INVENTION

Problems Invention Aims to Solve

PBT resins themselves are resins that have a comparative tracking index, based on the IEC 60112 standard, that satisfies the highest rank within the standard of 600 V or higher. However, various fillers such as reinforcing fillers, flame retardants and stabilizers are typically used in PBT resins to alter various properties such as the mechanical strength, and depending on the types of fillers used, the tracking resistance can sometimes be impaired. For example, it is known that when glass fiber, which is widely used as a reinforcing filler, is added to a PBT resin, the tracking resistance deteriorates significantly depending on the amount of filler added.

Accordingly, objects of embodiments of the present invention are to provide a PBT resin composition having excellent tracking resistance that has been reinforced with glass fiber, and to provide a method for improving the tracking resistance of a PBT resin composition that contains glass fiber.

Means for Solution of the Problems

One embodiment of the present invention relates to a polybutylene terephthalate resin composition containing a polybutylene terephthalate resin, 10 to 20% by mass of glass fiber relative to the total mass of the composition, an ethylene/ethyl acrylate copolymer, and an epoxy compound having an epoxy equivalent weight of 600 to 1,500 g/equivalent, and having the comparative tracking index (CTI) of 600 V or higher, measured in accordance with the third edition of IEC 60112.

Another embodiment of the present invention relates to a vehicle-mounted connector obtained by molding the polybutylene terephthalate resin composition of the embodiment of the present invention described above.

Yet another embodiment of the present invention relates to a method for increasing the comparative tracking index (CTI) of a polybutylene terephthalate resin composition measured in accordance with the third edition of IEC 60112, the method comprising adding an epoxy compound having an epoxy equivalent weight of 600 to 1,500 g/equivalent and an ethylene/ethyl acrylate copolymer to a polybutylene terephthalate resin composition containing a polybutylene terephthalate resin and 10 to 20% by mass of glass fiber relative to the total mass of the composition.

Yet another embodiment of the present invention relates to the use of an epoxy compound having an epoxy equivalent weight of 600 to 1,500 g/equivalent and an ethylene/ethyl acrylate copolymer for increasing the comparative tracking index (CTI), measured in accordance with the third edition of IEC 60112, of a polybutylene terephthalate resin composition containing a polybutylene terephthalate resin and 10 to 20% by mass of glass fiber relative to the total mass of the composition.

Effects of the Invention

An embodiment of the present invention is able to provide a PBT resin composition that has been reinforced with glass fiber, and also has excellent mechanical properties and high tracking resistance.

Further, another embodiment of the present invention is able to provide a method for improving the tracking resistance of a PBT resin composition that contains glass fiber.

EMBODIMENTS FOR CARRYING OUT THE INVENTION

Preferred embodiments of the present invention are described below, but the present invention is in no way limited by the following embodiments.

A PBT resin composition according to an embodiment of the present invention contains at least a PBT resin, glass fiber, an ethylene/ethyl acrylate copolymer (hereafter also abbreviated as an "EEA copolymer") and an epoxy compound.

<PBT Resin>

The PBT resin (polybutylene terephthalate resin) is a resin obtained by polycondensation of a dicarboxylic acid component containing at least terephthalic acid or an ester-forming derivative thereof (such as a $C_1$ to $C_6$ alkyl ester or an acid halide), and a glycol component containing at least an alkylene glycol containing 4 carbon atoms (1,4-butanediol) or an ester-forming derivative thereof (such as an acetylated derivative).

The PBT resin is not limited to homo-polybutylene terephthalate, and may contain other dicarboxylic acid units besides the terephthalic acid units, and other diol units besides the 1,4-butanediol units. In such cases, the total of all the dicarboxylic acid units preferably includes at least 70 mol %, and more preferably at least 90 mol %, of terephthalic acid units, and the total of all the diol units preferably includes at least 70 mol %, and more preferably at least 90 mol %, of 1,4-butane diol units.

Although there are no particular limitations on the amount of terminal carboxyl groups in the PBT resin, from the viewpoint of suppressing any deterioration in the strength caused by hydrolysis under hot and humid conditions, the amount of terminal carboxyl groups is preferably not more than 30 meq/kg (milliequivalents/kg), and is more preferably 25 meq/kg or less.

The intrinsic viscosity (IV) of the PBT resin is preferably from 0.60 to 1.20 dL/g, and is more preferably at least 0.70 dL/g and even more preferably 0.90 dL/g or greater, and more preferably not more than 1.10 dL/g and even more preferably 1.05 dL/g or less. When a PBT resin having an intrinsic viscosity within this range is used, the resulting PBT resin composition exhibits excellent fluidity, and molded articles having more favorable mechanical properties can be obtained.

The intrinsic viscosity may also be altered by blending a plurality of PBT resins having different intrinsic viscosities. For example, a PBT resin having an intrinsic viscosity of 0.9 dL/g and a PBT resin having an intrinsic viscosity of 0.7 dL/g can be blended together to prepare a PBT resin having an intrinsic viscosity of 0.8 dL/g. The intrinsic viscosity (IV) of the PBT resin can be measured, for example, in o-chlorophenol at a temperature of 35° C., and the values mentioned above represent values measured under these conditions.

In the PBT resin, examples of other dicarboxylic acid components (comonomer components) besides the terephthalic acid or ester-forming derivative thereof include $C_8$ to $C_{14}$ aromatic dicarboxylic acids such as isophthalic acid, phthalic acid, 2,6-naphthalene dicarboxylic acid and 4,4'-dicarboxydiphenyl ether; $C_4$ to $C_{16}$ alkane dicarboxylic acids such as succinic acid, adipic acid, azelaic acid and sebacic acid; $C_5$ to $C_{10}$ cycloalkane dicarboxylic acids such as cyclohexane dicarboxylic acid; and ester-forming derivatives (such as $C_1$ to $C_6$ alkyl ester derivatives and acid halides) of these dicarboxylic acid components. These dicarboxylic acid components may be used individually, or a combination of two or more components may be used.

Among these dicarboxylic acid components, $C_8$ to $C_{12}$ aromatic dicarboxylic acids such as isophthalic acid and $C_6$ to $C_{12}$ alkane dicarboxylic acids such as adipic acid, azelaic acid and sebacic acid are particularly preferable.

In the PBT resin, examples of other glycol components (comonomer components) besides the 1,4-butanediol include $C_2$ to $C_{10}$ alkylene glycols such as ethylene glycol, propylene glycol, trimethylene glycol, 1,3-butylene glycol, hexamethylene glycol, neopentyl glycol and 1,3-octanediol; polyoxyalkylene glycols such as diethylene glycol, triethylene glycol and dipropylene glycol; alicyclic diols such as cyclohexanedimethanol and hydrogenated bisphenol A; aromatic diols such as bisphenol A and 4,4'-dihydroxybiphenyl; $C_2$ to $C_4$ alkylene oxide adducts of bisphenol A such as ethylene oxide 2-mol adducts of bisphenol A and propylene oxide 3-mol adducts of bisphenol A; and ester-forming derivatives (such as acetylated derivatives) of these glycols. These glycol components may be used individually, or a combination of two or more components may be used.

Among these glycol components, $C_2$ to $C_6$ alkylene glycols such as ethylene glycol and trimethylene glycol, polyoxyalkylene glycols such as diethylene glycol, and alicyclic diols such as cyclohexanedimethanol and the like are particularly preferable.

Examples of comonomer components (other comonomer components) that may be used besides the dicarboxylic acid component and the glycol component include aromatic hydroxycarboxylic acids such as 4-hydroxybenzoic acid, 3-hydroxybenzoic acid, 6-hydroxy-2-naphthoic acid and 4-carboxy-4'-hydroxybiphenyl; aliphatic hydroxycarboxylic acids such as glycolic acid and hydroxycaproic acid; $C_3$ to $C_{12}$ lactones such as propiolactone, butyrolactone, valerolactone and caprolactones (such as ε-caprolactone); and ester-forming derivatives (such as $C_1$ to $C_6$ alkyl ester derivatives, acid halides and acetylated derivatives) of these comonomer components.

The amount of these other comonomer components is preferably not more than 10% by mass of all of the monomer components.

A combination of a plurality of different PBT resins may be used as the PBT resin. For example, a PBT resin containing other dicarboxylic acids besides the butylene terephthalate units and/or other diol units besides the 1,4-butanediol units may be combined with a homo-PBT resin, or a plurality of PBT resins having different dicarboxylic acid and/or diol components may be combined.

The PBT resin composition may also contain a resin other than the PBT resin, provided the effects of the present invention are not impaired. For example, another polyester resin such as a polyethylene terephthalate (PET) resin, polypropylene terephthalate (PPT) resin, polybutylene naphthalate (PBN) resin or polyethylene naphthalate (PEN) resin may be used in combination with the PBT resin.

<Glass Fiber>

A conventional glass fiber can be used favorably as the glass fiber. There are no particular limitations on the length (cut length), the diameter or the shape of the glass fibers (examples include cylindrical fibers, cocoon-shaped fibers, and fibers having an oval-shaped cross-section). There are also no particular limitations on the glass cutting method used when cutting glass strands or glass roving into chopped strands of a prescribed length.

There are also no particular limitations on the variety of glass used, but in terms of quality, either E-glass or corrosion-resistant glass containing the element zirconium within the glass composition can be used particularly favorably.

Further, in order to improve the interface characteristics between the glass fiber and the resin matrix, glass fiber that has been surface-treated with an organic treatment agent (surface treatment agent) such as a silane compound including an aminosilane compound or an epoxy compound can be used favorably. There are no particular limitations on this surface treatment agent, and any conventional surface treatment agent can be used favorably.

In order to impart the resin composition with the desired mechanical properties, the glass fiber is preferably used in an amount within a range from 10 to 20% by mass relative to the total mass of the composition. In particular, in order to ensure satisfactory tensile elongation properties, the amount of glass fiber is preferably not more than 18% by mass, and from the viewpoint of further improving the strength, the amount of glass fiber is preferably 12% by mass or more.

As a result of investigations by the inventors of the present invention, it was found that although adding the glass fiber to the PBT resin reduced the CTI, there was no correlation between the amount of glass fiber added and the degree of reduction in the CTI. For example, it was found that a PBT resin composition in which the amount of glass fiber was 15% by mass underwent a larger reduction in the CTI than a composition in which the amount of glass fiber was 30% by mass, and the reduction in the CTI was particularly evident at amounts in the vicinity of 15% by mass.

However, in the embodiments of the present invention, by adding the prescribed epoxy compound and EEA copolymer to the composition, any reduction in the CTI caused by the addition of 10 to 20% by mass of glass fiber to the composition can be satisfactorily suppressed.

<EEA Copolymer>

The EEA copolymer (ethylene/ethyl acrylate copolymer) is a copolymer formed using ethylene and ethyl acrylate as copolymerization components. There are no particular limitations on the form of the copolymer, and a random, block or graft copolymer may be used. For example, the copolymer may have two or more partial structures selected from among random structures, block structures and graft structures.

There are no particular limitations on the ratio between the ethylene and the ethyl acrylate in the copolymer. From the viewpoints of ensuring good compatibility with the PBT resin and suppressing blocking during production, the melting point of the EEA copolymer is preferably at least 85° C., more preferably at least 88° C., and even more preferably 90° C. or higher.

In the present embodiment, in order to improve the tracking resistance, it is preferable to use an EEA copolymer that contains substantially no comonomer components besides the ethylene and the ethyl acrylate. However, portions of other comonomer components may be included, provided they do not impair the effects of the present embodiment. Specifically, if other comonomers besides the ethylene and the ethyl acrylate are incorporated in the composition in an amount of about 30% by mass, then there is a possibility that the desired tracking resistance improvement effect may not be adequately achieved, and therefore the amount of these other comonomers is preferably not more than 10% by mass of all the copolymerization monomers. Examples of these other comonomers include maleic anhydride and (meth)acrylate esters such as butyl acrylate and methyl methacrylate, and comonomers that do not contain a highly reactive functional group such as a glycidyl group are preferred.

The EEA copolymer can be produced by any suitable method. For example, the EEA copolymer can be obtained by mixing prescribed amounts of the ethylene and the ethyl acrylate (and any other comonomer components), and then performing a radical polymerization by normal methods using a radical initiator.

From the viewpoint of improving the CTI of the PBT resin composition, the amount added of the EEA copolymer, relative to the total mass of the PBT resin composition, is preferably at least 4% by mass, and more preferably 5% by mass or greater. Although there are no particular limitations on the upper limit for the amount added, the amount is preferably not more than about 15% by mass, and is more preferably about 10% by mass or less.

<Epoxy Compound>

A compound having at least one epoxy group in one molecule and having an epoxy equivalent weight of 600 to 1,500 g/equivalent (g/eq) is used as the epoxy compound. Provided the epoxy equivalent weight satisfies this range, the CTI of the PBT resin composition can be improved without the generation of black foreign matter in the molded articles formed from the composition, and the moldability (extrudability) of the composition is also excellent. The epoxy equivalent weight (g/eq) is preferably at least 650 and more preferably 700 or greater, and is preferably not more than 1,200, more preferably not more than 1,100, and even more preferably 1,000 or less.

Although there are no particular limitations on the epoxy compound provided the epoxy equivalent weight satisfies the above range, epoxy compounds that contain a halogen atom such as bromine tend to be prone to carbonization, which may be disadvantageous in terms of the tracking resistance. Accordingly, the use of an epoxy compound that contains no halogens is preferable from the viewpoint of suppressing the generation of carbides and therefore suppressing any reduction in the tracking resistance, and from the viewpoint of suppressing the incorporation of black foreign matter into the molded articles.

Specifically, from the viewpoint of enhancing the thermal stability and the hydrolysis resistance, the use of an aromatic epoxy compound is preferred. Examples of aromatic epoxy compounds that may be used include biphenyl epoxy compounds, bisphenol A epoxy compounds, phenol novolac epoxy compounds, and cresol novolac epoxy compounds.

A combination of two or more compounds may also be used as the epoxy compound.

From the viewpoints of satisfactorily suppressing any reduction in the CTI and suppressing the generation of black foreign matter, the amount of epoxy groups in the epoxy compound contained in the composition is preferably within a range from $0.5 \times 10^{-2}$ to $2.5 \ 1 \times 10^{-2}$ mmol/g. The amount is more preferably at least $1.0 \times 10^{-2}$ mmol/g and is also more preferably not more than $2.1 \times 10^{-2}$ mmol/g. The amount of epoxy groups is a value obtained by multiplying the amount of the epoxy compound added to the composition by the inverse of the epoxy equivalent weight.

<Other Optional Components>

The PBT resin composition may also contain other components besides the components described above, provided they do not impair the effects of the present invention. Examples of these other components include additives such as antioxidants, ultraviolet absorbers, stabilizers, plasticizers, release agents, colorants such as dyes and pigments, near-infrared absorbers, fluorescent whiteners, flame retardants, flame retardancy assistants, and fillers other than glass fiber. One or more of these other components may be added as required.

<Method for Producing PBT Resin Composition>

The PBT resin composition can be produced using any of the various methods known as methods for producing thermoplastic resin compositions. In one example of a preferred method, a melt-kneading apparatus such as a single-screw or twin-screw extruder is used to subject the various components to melt-kneading and extrusion to form pellets.

<Comparative Tracking Index (CTI)>

The PBT resin composition of the embodiment of the present invention described above has extremely superior tracking resistance performance, indicated by a comparative tracking index (CTI) of 600 V or higher. Because the PBT resin composition of this embodiment has this property, it is very stable and unlikely to suffer dielectric breakdown, and can therefore by used favorably for various vehicle-mounted molded articles that are subjected to extreme usage conditions in which the temperature variation is large, and is particularly useful for vehicle-mounted connectors.

The CTI can be determined using the measurement method prescribed in the third edition of IEC (International Electrotechnical Commission) 60112. Specifically, the CTI is measured using a 0.1% by mass aqueous solution of ammonium chloride and a platinum electrode. More specifically, a prescribed number of drops (50 drops) of this aqueous solution of ammonium chloride is dripped onto each test piece, and the voltage at which none of the test pieces (n=S) undergoes breakdown is determined and recorded as the CTI.

<Molded Article of PBT Resin Composition>

As described above, the PBT resin composition exhibits extremely superior tracking resistance performance, and can therefore be used favorably for electrical and electronic components such as relays, switches, connectors, actuators, sensors, transformer bobbins, terminal blocks, covers, sockets, coils and plugs, and can be used particularly favorably for components near power sources. Moreover, because the PBT resin composition yields excellent mechanical properties such as tensile properties and Charpy impact strength, it can also be used favorably as the molding material for vehicle-mounted components, including vehicle component casings such as ECU boxes and connector boxes, and other vehicle-mounted electrical components.

There are no particular limitations on the method used for obtaining a molded article using this PBT resin composition, and a conventional method may be employed. For example, a molded article can be prepared by supplying the PBT resin composition to an extruder, melt-kneading and then pelletizing the composition, and subsequently supplying the resulting pellets to an injection molding machine fitted with a prescribed mold to perform injection molding.

The CTI of the molded article is preferably 600 V or higher. In terms of the mechanical properties of the molded article, the tensile strength is preferably at least 70 MPa, and more preferably 75 MPa or greater. The tensile elongation is preferably at least 3%, and more preferably 3.2% or greater. The flexural strength is preferably at least 120 MPa, and more preferably 130 MPa or greater. The flexural modulus is preferably at least 3 GPa, and more preferably 4 GPa or greater. Further, the Charpy impact strength is preferably at least 4 kJ/m$^2$, and more preferably 5 kJ/m$^2$ or greater.

<CTI Improvement Method>

This embodiment is a method for improving the CTI of a PBT resin composition by adding an epoxy compound having an epoxy equivalent weight of 600 to 1,500 g/equivalent and an EEA copolymer to a PBT resin composition containing at least a PBT resin and 10 to 20% by mass of glass fiber relative to the total mass of the composition.

If only the EEA copolymer is added to the PBT resin composition containing the PBT resin and glass fiber, then the CTI cannot be adequately improved, and the same is true if only the epoxy compound is added to the PBT resin composition containing the PBT resin and glass fiber, but by using a combination of the EEA copolymer and a prescribed epoxy compound, any reduction in the CTI caused by the addition of the glass fiber can be satisfactorily suppressed, and superior tracking resistance indicated by a CTI of 600 V or higher can be achieved.

In the above method for improving the CTI, the amount added of the epoxy compound is preferably sufficient to provide an amount of epoxy groups within the composition within a range from $0.5\times10^{-2}$ to $2.5\times10^{-2}$ mmol/g. The amount added of the ethylene/ethyl acrylate copolymer is preferably at least 4% by mass relative to the total mass of the composition.

Further, the above method for improving the CTI is preferably a method that enables the CTI to be increased to a value of 600 V or higher.

<Use of Epoxy Compound and EEA Copolymer>

This embodiment relates to use of an epoxy compound having an epoxy equivalent weight of 600 to 1,500 g/equivalent and an EEA copolymer for improving the CTI of a PBT resin composition containing a PBT resin and 10 to 20% by mass of glass fiber relative to the total mass of the composition.

In the use described above, the epoxy compound is preferably added to the composition in an amount sufficient to provide an amount of epoxy groups within the composition within a range from $0.5\times10^{-2}$ mmol/g. The ethylene/ethyl acrylate copolymer is preferably added to the composition in an amount of at least 4% by mass relative to the total mass of the composition.

Further, the above use is preferably a use that enables the CTI to be increased to a value of 600 V or higher.

EXAMPLES

The embodiments of the present invention are described below in further detail using a series of examples, but the present invention is in no way limited by the following examples.

<Production of PBT Resin Compositions>

In each example and each comparative example, a PBT resin a glass fiber, an EEA copolymer and an epoxy compound were blended in the amounts (% by mass) shown below in Table 1, and the resulting mixture was subjected to melt-kneading at a cylinder temperature of 260° C. using a twin-screw extruder (manufactured by The Japan Steel Works, Ltd.) having screws of 30 mmϕ thus obtaining a pelletized PBT resin composition. In Comparative Example 10, a maleic anhydride-modified polyolefin was used instead of the EEA copolymer.

Details of each of the components used are as follows.
(1) PBT Resin
  PBT resin, manufactured by WinTech Polymer Ltd. (intrinsic viscosity: 0.98 dL/g, amount of terminal carboxyl groups: 16 meq/kg)
(2) Glass Fiber
  ECS03T-127, manufactured by Nippon Electric Glass Co., Ltd. (glass fiber diameter: 13 μm)
(3) EEA Copolymer
  EEA copolymer (ethylene content: 75% by mass, melting point: 91° C.)
(4) Epoxy Compounds
  Epoxy compound 1: a bisphenol A epoxy resin (number average molecular weight: 1,600, epoxy equivalent weight: 925 g/eq)
  Epoxy compound 2: a bisphenol A epoxy resin (number average molecular weight: 1,300, epoxy equivalent weight: 720 g/eq)
  Epoxy compound 3: EPIKOTE 1001 manufactured by Mitsubishi Chemical Corporation (number average molecular weight: 900, epoxy equivalent weight: 500 g/eq)
(5) Other Component
  Maleic anhydride-modified polyolefin (maleic anhydride-modified ethylene/propylene copolymer): TAFMER MP0610 manufactured by Mitsui Chemicals, Inc. (melting point: 100° C. or higher)

<Evaluations>

The evaluations described below were performed using each of the obtained resin pellets.
(1) Tracking Resistance
  Using a 0.1% by mass aqueous solution of ammonium chloride and a platinum electrode, the applied voltage (V: volts) at which tracking occurred in a test piece was measured in accordance with the third edition of IEC 60112. Test pieces for which dielectric breakdown did not occur even when 600 V was applied were evaluated as "600 V or higher".
(2) Tensile Strength and Tensile Elongation
  Following drying of the obtained pellets at 140° C. for 3 hours, injection molding was performed at a molding temperature of 260° C. and a mold temperature of 80° C. to prepare tensile test pieces. Using these test pieces, the tensile strength (MPa) and the tensile elongation (%) were measured in accordance with the evaluation criteria prescribed in ISO 527-1, 2.

(3) Flexural Strength and Flexural Modulus

Following drying of the obtained pellets at 140° C. for 3 hours, injection molding was performed at a molding temperature of 260° C. and a mold temperature of 80° C. to prepare flexural test pieces. Using these test pierces, the flexural strength (MPa) and the flexural modulus (GPa) were measured in accordance with the evaluation criteria prescribed in ISO 178.

(4) Charpy Impact Strength

Following drying of the obtained pellets at 140° C. for 3 hours, injection molding was performed at a molding temperature of 260° C. and a mold temperature of 80° C. to prepare a Charpy impact test piece. Using this test piece, the Charpy impact strength (notched) (kJ/m$^2$) was measured in accordance with ISO 179/1eA.

(5) Black Foreign Matter

Following drying of the obtained pellets at 140° C. for 3 hours, the pellets were supplied to an injection molding machine (EC40 manufactured by Toshiba Machine Co., Ltd.), a tensile test piece prescribed in ISO 3167 was injection molded at a molding temperature of 260° C. and a mold temperature of 80° C., and the degree of black foreign matter was evaluated by visual inspection.

An evaluation of A was recorded if absolutely no black foreign matter was observed, an evaluation of B was recorded if almost no black foreign matter was observed, and an evaluation of C was recorded if a large amount of black foreign matter was observed.

The results of the above evaluations are shown in Table 1.

TABLE 1

| | | | | | Example (Blend amounts indicate % by mass) | | | | | |
|---|---|---|---|---|---|---|---|---|---|---|---|
| | | 1 | 2 | 3 | 4 | 5 | 6 | 7 | 8 | 9 | 11 |
| PBT | | 84.0 | 81.0 | 79.0 | 77.0 | 75.0 | 78.5 | 77.0 | 76.5 | 70.0 | 77.0 |
| Glass fiber | | 10.0 | 13.0 | 15.0 | 15.0 | 15.0 | 15.0 | 17.0 | 17.0 | 20.0 | 17.0 |
| EEA copolymer | | 5.0 | 5.0 | 5.0 | 7.0 | 9.0 | 5.0 | 5.0 | 5.0 | 9.0 | 5.0 |
| Maleic anhydride-modified polyolefin | | | | | | | | | | | |
| Epoxy compound 1 | equivalent weight: 925 g/eq | 1.0 | 1.0 | 1.0 | 1.0 | 1.0 | 1.5 | | | 1.0 | 1.0 |
| Epoxy compound 2 | equivalent weight: 720 g/eq | | | | | | | | 1.0 | 1.5 | |
| Epoxy compound 3 | equivalent weight: 500 g/eq | | | | | | | | | | |
| Amount of epoxy groups (×10$^{-2}$ mmol/g) | | 1.1 | 1.1 | 1.1 | 1.1 | 1.1 | 1.6 | 1.4 | 2.1 | 1.1 | 1.1 |
| Comparative tracking index (V) | | ≥600 | ≥600 | ≥600 | ≥600 | ≥600 | ≥600 | ≥600 | ≥600 | ≥600 | ≥600 |
| Tensile strength (MPa) | | 80 | 88 | 97 | 98 | 95 | 101 | 100 | 101 | 98 | 100 |
| Tensile elongation (%) | | 4.0 | 4.2 | 4.4 | 3.6 | 3.4 | 3.4 | 3.7 | 3.3 | 4.0 | 4.1 |
| Flexural strength (MPa) | | 134 | 145 | 152 | 153 | 147 | 159 | 151 | 160 | 145 | 156 |
| Flexural modulus (GPa) | | 4.2 | 4.8 | 5.0 | 5.1 | 4.9 | 5.2 | 5.0 | 5.3 | 5.2 | 5.1 |
| Charpy impact strength (kJ/m$^2$) | | 7 | 11 | 14 | 12 | 13 | 11 | 11 | 10 | 14 | 13 |
| Black foreign matter (visual inspection) | | A | A | A | A | A | A | A | A | A | A |

| | | | | | Comparative Example (Blend amounts indicate % by mass) | | | | | |
|---|---|---|---|---|---|---|---|---|---|---|
| | | 1 | 2 | 3 | 4 | 5 | 6 | 7 | 9 | 10 |
| PBT | | 100.0 | 85.0 | 80.0 | 84.0 | 79.3 | 70.0 | 65.0 | 64.0 | 79.0 |
| Glass fiber | | | 15.0 | 15.0 | 15.0 | 15.0 | 30.0 | 30.0 | 30.0 | 15.0 |
| EEA copolymer | | | | 5.0 | | 5.0 | | 5.0 | 5.0 | |
| Maleic anhydride-modified polyolefin | | | | | | | | | | 5.0 |
| Epoxy compound 1 | equivalent weight: 925 g/eq | | | | 1.0 | | | | 1.0 | 1.0 |
| Epoxy compound 2 | equivalent weight: 720 g/eq | | | | | | | | | |
| Epoxy compound 3 | equivalent weight: 500 g/eq | | | | | 0.7 | | | | |
| Amount of epoxy groups (×10$^{-2}$ mmol/g) | | | | | 1.1 | 1.4 | | | 1.1 | 1.1 |
| Comparative tracking index (V) | | ≥600 | 325 | 425 | 325 | Production impossible | 375 | 575 | ≥600 | 550 |
| Tensile strength (MPa) | | 60 | 105 | 303 | 108 | | 140 | 128 | 129 | 99 |
| Tensile elongation (%) | | 50.0 | 2.5 | 3.0 | 2.8 | | 2.2 | 2.7 | 2.8 | 4.1 |
| Flexural strength (MPa) | | 95 | 160 | 150 | 160 | | 220 | 194 | 198 | 156.7 |
| Flexural modulus (GPa) | | 2.6 | 5.3 | 4.8 | 5.3 | | 9.0 | 7.8 | 7.9 | 5.4 |
| Charpy impact strength (kJ/m$^2$) | | 3 | 6 | 7 | 6 | | 11 | 11 | 12 | 16 |
| Black foreign matter (visual inspection) | | A | A | A | A | | A | A | A | A |

As is evident from Table 1, in each of the examples, a PBT resin composition having the CTI of 600 V or higher and having excellent results for each of the mechanical properties was obtained.

In contrast, Comparative Example 1 shows that if the glass fiber is not added, then although the CTI of the PBT resin is 600 V or higher, the desired mechanical properties (tensile strength, flexural properties and Chirpy impact strength) cannot be obtained. Comparative Example 2 shows that when the glass fiber is added to the PBT resin, the mechanical properties improve, but the CTI decreases markedly. Comparative Examples 3 and 4 show that even if one of the EEA copolymer or the epoxy compound is added to the PBT resin composition containing glass fiber, the CTI can still not be adequately improved. Comparative Example 5 shows that if the epoxy equivalent weight of the epoxy compound is too small, then because the softening point is low, blocking occurs at the supply port of the extruder, making production of the pellets impossible.

In Comparative Examples 6 and 7, the amount of the glass fiber was 30% by mass, and it is evident from comparison with Comparative Examples 2 and 3 that when the amount of glass fiber is 30% by mass, the degree of decrease in the CTI is smaller than when the amount of glass fiber is 15% by mass, and some CTI improvement can be obtained even with addition of only the EEA copolymer. Comparative Example 9 shows that when the amount of glass fiber is 30% by mass, although adding both the EEA copolymer and the epoxy compound yields a CTI improvement effect, the tensile elongation is unsatisfactory (less than 3%), indicating inferior mechanical properties. Further, Comparative Example 10 is a test example in which an alternative olefin copolymer was used instead of the EEA copolymer, and shows that if the EEA copolymer is not added, then a CTI improvement effect cannot be obtained.

Moreover, for Example 10, a PBT resin composition (having an amount of epoxy groups in the composition of $2.7 \times 10^{-2}$ mmol/g) was produced in which the amount of the PBT resin from Example 3 was altered to 77.5% by mass and the amount of the epoxy compound 1 was altered to 2.5% by mass (but the amounts of the glass fiber and the EEA copolymer were kept the same as Example 3), and tracking resistance and black foreign matter tests were performed in the same manner as described above. The results revealed that although the comparative tracking index was 600 V or higher, because the amount of epoxy groups in the composition was large, black foreign matter contamination was observed.

Further, for Comparative Example 8, a PBT resin composition (having an amount of epoxy groups in the composition of $1.4 \times 10^{-2}$ mmol/g) was produced in which the amount of the PBT resin from Example 3 was altered to 74.5% by mass, and an epoxy compound 4 described below was added in an amount of 0.7% by mass (but the amounts of the glass fiber and the EEA copolymer were kept the same as Example 3), and a black foreign matter test was performed in the same manner as described above.

Epoxy compound 4: EPIKOTE 1010 manufactured by Mitsubishi Chemical Corporation (number average molecular weight: 5,500, epoxy equivalent weight: 4,000 g/eq)

The result indicated that when the epoxy equivalent weight of the epoxy compound is too high, black foreign matter contamination tends to occur (evaluation C).

This Application is related to the subject matter disclosed in prior Japanese Application 2015-142207 filed on Jul. 16, 2015, the entire contents of which are incorporated by reference herein.

It should be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A method of making a polybutylene terephthalate resin composition with an increased comparative tracking index measured in accordance with a third edition of IEC 60112, the method comprising combining a polybutylene terephthalate component, glass fiber, an epoxy compound having an epoxy equivalent weight of 600 to 1,500 g/equivalent, an ethylene/ethyl acrylate copolymer, and optionally one or more additives to form the polybutylene terephthalate resin composition;
   wherein the polybutylene terephthalate component consists of at least one polybutylene terephthalate resin and optionally another polyester resin;
   wherein the polybutylene terephthalate resin composition consists of: said polybutylene terephthalate component; 10 to 20% by mass, relative to the total mass of the composition, of said glass fiber; an amount of said epoxy compound, such that an amount of epoxy groups in the composition is within a range from $0.5 \times 10^{-2}$ to $2.5 \times 10^{-2}$ mmol/g; 4 to about 15% by mass, relative to the total mass of the composition, of said ethylene/ethyl acrylate copolymer; and said one or more optional additives;
   wherein the polybutylene terephthalate resin composition has a comparative tracking index of 600 V or higher, and a molded article of the polybutylene terephthalate resin composition has a tensile elongation of at least 3%.

2. The method according to claim 1, wherein a molded article of the polybutylene terephthalate resin composition has a tensile elongation of at least 3.2%.

3. The method according to claim 1, wherein the glass fiber is present in an amount of 12 to 18% by mass, relative to the total mass of the composition.

4. The method according to claim 1, wherein the epoxy compound is present in an amount such that an amount of epoxy groups in the composition is within a range from $1.0 \times 10^{-2}$ to $2.1 \times 10^{-2}$ mmol/g.

5. The method according to claim 1, wherein the ethylene/ethyl acrylate copolymer is present in an amount of 5 to about 10% by mass, relative to the total mass of the composition.

6. The method according to claim 1, wherein said one or more additives is selected from the group consisting of antioxidants, ultraviolet absorbers, stabilizers, plasticizers, release agents, colorants, near-infrared absorbers, fluorescent whiteners, flame retardants, flame retardancy assistants, and fillers other than glass fiber.

7. A method of making a polybutylene terephthalate resin composition with an increased comparative tracking index measured in accordance with a third edition of IEC 60112, the method comprising combining a polybutylene terephthalate resin, glass fiber, an epoxy compound having an epoxy equivalent weight of 600 to 1,500 g/equivalent, and an ethylene/ethyl acrylate copolymer to form the polybutylene terephthalate resin composition; wherein the polybutylene terephthalate resin composition consists of said polybutylene terephthalate resin, said glass fiber, said epoxy compound, and said ethylene/ethyl acrylate copolymer; wherein the glass fiber is present in an amount of 10 to 20% by mass relative to a total mass of the polybutylene terephthalate resin composition; and
   wherein the polybutylene terephthalate resin composition has a comparative tracking index of 600 V or higher.

* * * * *